(12) United States Patent
Kim

(10) Patent No.: US 12,276,999 B2
(45) Date of Patent: Apr. 15, 2025

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 63 days.

(21) Appl. No.: 18/226,112

(22) Filed: Jul. 25, 2023

(65) Prior Publication Data
US 2024/0286569 A1    Aug. 29, 2024

(30) Foreign Application Priority Data
Feb. 23, 2023  (KR) .......................... 10-2023-0024152

(51) Int. Cl.
| | |
|---|---|
| G05G 1/30 | (2008.04) |
| B60K 26/02 | (2006.01) |
| B60R 21/09 | (2006.01) |
| B60T 7/04 | (2006.01) |
| B60T 7/06 | (2006.01) |
| G05G 1/36 | (2008.04) |
| G05G 1/40 | (2008.04) |
| G05G 1/44 | (2008.04) |
| G05G 5/00 | (2006.01) |

(52) U.S. Cl.
CPC ............... *G05G 1/36* (2013.01); *B60R 21/09* (2013.01); *B60T 7/06* (2013.01); *G05G 1/40* (2013.01); *G05G 1/44* (2013.01); *G05G 5/005* (2013.01); *B60K 2026/026* (2013.01)

(58) Field of Classification Search
CPC .. B60R 21/09; B60K 26/02; B60K 2026/026; B60T 7/04; B60T 7/06; G05G 1/40; G05G 5/005; G05G 1/44; G05G 1/36
See application file for complete search history.

(56) References Cited

U.S. PATENT DOCUMENTS

| | | | | |
|---|---|---|---|---|
| 2,242,138 | A * | 5/1941 | Muma ...................... | B60N 2/14 74/513 |
| 11,465,498 | B1 * | 10/2022 | Kim ....................... | B60K 26/02 |
| 2019/0315259 | A1 * | 10/2019 | Lee ........................ | B60N 3/002 |
| 2023/0024609 | A1 * | 1/2023 | Kim ........................ | G05G 5/28 |

FOREIGN PATENT DOCUMENTS

| | | | |
|---|---|---|---|
| CN | 205589381 U | * 9/2016 | |
| KR | 10-2021-0125733 | 10/2021 | |
| WO | WO-2018151270 A1 | * 8/2018 | ............... B60N 3/06 |

OTHER PUBLICATIONS

Machine translation of CN 205589381 U, Xiang et al., Sep. 21, 2016. (Year: 2016).*
Machine translation of WO 2018151270 A1, Izume, Aug. 23, 2018 (Year: 2018).*

* cited by examiner

*Primary Examiner* — Adam D Rogers
(74) *Attorney, Agent, or Firm* — Morgan, Lewis & Bockius LLP

(57) ABSTRACT

A foldable pedal apparatus for a vehicle includes an accelerator pedal module and a brake pedal module that are operated in a pressure-manipulated type are popped up to allow manipulation by a driver in a manual driving mode, and hide to prevent manipulation by the driver in a autonomous driving mode, to generate a signal related to a pedal function by manipulation of the accelerator pedal module and the brake pedal module.

20 Claims, 13 Drawing Sheets

< Ⓐ part >

< Ⓑ part >

FOLDABLE PEDAL APPARATUS FOR VEHICLE

CROSS REFERENCE TO RELATED APPLICATIONS

The present application claims priority to Korean Patent Application No. 10-2023-0024152, filed Feb. 23, 2023, the entire contents of which is incorporated herein for all purposes by this reference.

BACKGROUND OF THE PRESENT DISCLOSURE

Field of the Present Disclosure

The present disclosure relates to a foldable pedal apparatus for a vehicle, and more particularly, to a foldable pedal apparatus for a vehicle, wherein an accelerator pedal module and a brake pedal module that are operated in a pressure-manipulated type are popped up so that manipulation by a driver is possible in a manual driving mode, and the accelerator pedal module and the brake pedal module are hidden so that manipulation by the driver is impossible in an autonomous driving mode.

Description of Related Art

Autonomous vehicles are smart vehicles with autonomous driving technology to reach a destination itself even when a driver does not directly manipulate a steering wheel, an accelerator pedal, a brake pedal, etc., and recently, development thereof is being conducted intensively.

When the autonomous driving situation is generally realized, the driver can select a manual driving mode in which the driver directly drives a vehicle and an autonomous driving mode in which the driver does not directly drive, but the vehicle drives to the destination itself.

In the autonomous driving mode, the driver may take a rest in comfort while stretching legs, but when a pedal (accelerator pedal, brake pedal) located in a lower space of the driver's seat is exposed to the indoor space of the vehicle, the pedal disturbs the rest of the driver, which is a disadvantage.

Furthermore, the autonomous driving situation is a situation in which the driver does not manipulate the vehicle pedal (accelerator pedal, brake pedal). However, when the driver manipulates the pedal in the autonomous driving mode, a vehicle controller is configured to determine that the driver exits the autonomous driving mode and wants to perform the manual driving mode, and the vehicle controller terminates a control for the autonomous driving mode.

However, because the vehicle pedal is located in the lower space of the driver's seat to be exposed outward, in the autonomous driving situation, there is a risk that the driver unconsciously manipulates the pedal (situation of erroneous manipulation of pedal), and in the instant case, there is a risk that an accident may occur according to a traffic condition or a gap between vehicles.

Therefore, in the manual driving mode in which the driver directly drives the vehicle, the pedal is exposed to be projected toward the driver to allow manipulation by the driver, and in the autonomous driving situation, to achieve relaxation of the driver and safety such as prevention of erroneous manipulation, it is necessary to develop a technique of a foldable pedal to prevent exposure of the pedal to prevent manipulation by the driver.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal apparatus for a vehicle, wherein an accelerator pedal module and a brake pedal module that are operated in a pressure-manipulated type are popped up so that manipulation by a driver is possible in a manual driving mode, and the accelerator pedal module and the brake pedal module are hidden so that manipulation by the driver is impossible in an autonomous driving mode, and an objective of the present disclosure is directed to allow the driver to relax in the autonomous driving mode, and moreover, to prevent erroneous manipulation of a pedal in the autonomous driving mode to promote the improvement in safety.

Another objective of the foldable pedal apparatus according to an exemplary embodiment of the present disclosure as a pressure-manipulated type pedal device is directed to promote reduction of the number of parts thereof through simplification of configuration, cost and weight reduction, and size reduction through a compact configuration, and to minimize space required for foldable operation through simplification of a foldable mechanism to maximize the usability of the indoor space.

To achieve the above-described objectives, according to an exemplary embodiment of the present disclosure, there is provided a foldable pedal apparatus for a vehicle, the foldable pedal apparatus including: an accelerator pedal module and a brake pedal module provided on a foot rest panel to be rotatable in leftward and rightward directions, and configured to generate signals related to pedal functions thereof in response to manipulation of a driver, wherein when the accelerator pedal module and the brake pedal module are rotated to be inserted into a pedal groove formed in the foot rest panel, the accelerator pedal module and the brake pedal module may be in a hidden state to prevent manipulation of the accelerator pedal module and the brake pedal module by the driver, and when the accelerator pedal module and the brake pedal module are rotated to be projected from the pedal groove, the accelerator pedal module and the brake pedal module may be in a popped-up state to allow manipulation of the accelerator pedal module and the brake pedal module by the driver.

When the accelerator pedal module and the brake pedal module are rotated to be into the hidden state, the accelerator pedal module and the brake pedal module may be rotated in directions in which a gap therebetween may narrow, and when the accelerator pedal module and the brake pedal module are rotated into the popped-up state, the accelerator pedal module and the brake pedal module may be rotated in directions in which the gap therebetween may widen.

The pedal groove may be formed on an inclined surface of the foot rest panel; and pedal hinges may be provided on first and second portions of the pedal groove to be connected to the brake pedal module and the accelerator pedal module, respectively.

A lower end portion of the pedal groove may be formed in an inclined surface so that foreign substances, which enters an inner space of the pedal groove, may be discharged through the inclined surface outward from the inner space of the pedal groove.

The foldable pedal apparatus may include an accelerator pedal actuator and a brake pedal actuator which may be fixed to the foot rest panel and include plungers, respectively, the plungers being linearly moved: an accelerator pedal guide coupled to the plunger of the accelerator pedal actuator and a brake pedal guide coupled to the plunger of the brake pedal actuator; and an accelerator pedal leaf spring connecting the accelerator pedal guide and the accelerator pedal module to each other and a brake pedal leaf spring connecting the brake pedal guide and the brake pedal module to each other.

The accelerator pedal actuator and the brake pedal actuator may be securely provided on a surface opposite to a surface where the pedal groove may be formed, of the foot rest panel; and the accelerator pedal leaf spring and the brake pedal leaf spring may be provided through slot holes formed on the foot rest penal in first and second portions of the pedal groove.

When the accelerator pedal module and the brake pedal module are in the popped-up state in which each of the accelerator pedal module and the brake pedal module is projected from the pedal groove, the accelerator pedal guide and the brake pedal guide may be in a state in which the accelerator pedal guide and the brake pedal guide may be moved toward the accelerator pedal actuator and the brake pedal actuator, respectively, and the accelerator pedal leaf spring and the brake pedal leaf spring may be bent in arc shapes.

When the accelerator pedal module and the brake pedal module is in the hidden state in which each of the accelerator pedal module and the brake pedal module is inserted into the pedal groove, the accelerator pedal guide and the brake pedal guide are in a state in which the accelerator pedal guide and the brake pedal guide are moved to be spaced from the accelerator pedal actuator and the brake pedal actuator, respectively, and the accelerator pedal leaf spring and the brake pedal leaf spring are in a state in which the accelerator pedal guide and the brake pedal guide are unfolded in straight shapes.

Each of the accelerator pedal module and the brake pedal module may include: a pedal pad operated in a pressure type, including the same configuration for the accelerator pedal module and the brake pedal module, and configured to be manipulated in response to the driver's operation: an elastic damper stacked with a lower portion of the pedal pad: a printed circuit board (PCB) stacked with a lower portion of the elastic damper, and including a pressure sensor configured to generate an electric signal when being brought into contact with the elastic damper by manipulation of the pedal pad, and receiving the signal of the pressure sensor to generate a signal related to each pedal function of the accelerator pedal module and the brake pedal module; and a pedal casing covering the pedal pad, the elastic damper, and the PCB, and connected to each of the accelerator pedal leaf spring and the brake pedal leaf spring.

A driver's manipulation surface in the pedal pad may be projected from the pedal casing to enable the driver to step on and manipulate only the pedal pad.

Pedal hinges may be respectively provided on first and second portions of the pedal groove, and each of the pedal hinges may be connected to the pedal casing; and in the hidden state in which the accelerator pedal module and the brake pedal module may be inserted into the pedal groove, the pedal casing may be prevented from being projected out of the pedal groove.

Pedal hinges may be respectively provided on first and second portions of the pedal groove, and each of the pedal hinges may be connected to the pedal casing; and each of the accelerator pedal leaf spring and the brake pedal leaf spring may be connected to a location of the pedal casing to be spaced from each of the pedal hinges.

In the hidden state in which the accelerator pedal module and the brake pedal module may be inserted into the pedal groove, one surface of the pedal casing where each of the pedal hinges may be connected may be brought into contact with a side surface of the pedal groove, respectively, and while the surface of the pedal casing and the side surface of the pedal groove are in contact with each other, even when an external force is applied to the pedal casing, the pedal casing may be prevented from being rotated into the pedal groove.

A stopper guide may be integrally formed with the pedal groove; and in the hidden state in which the accelerator pedal module and the brake pedal module may be inserted into the pedal groove, the pedal casing may be brought into contact with the stopper guide so that even when external force is applied to the pedal casing, the pedal casing may be prevented from being rotated into the pedal groove.

In the hidden state in which the accelerator pedal module and the brake pedal module may be inserted into the pedal groove, when the operation signal of the pedal pad is generated, the PCB may disregard the operation signal not to generate the signal related to each pedal function.

In the hidden state in which the accelerator pedal module and the brake pedal module may be inserted into the pedal groove, the pedal casing may include a surface facing a surface of another pedal casing and the surface may be formed in an inclined surface, so that in a popping-up operation of the accelerator pedal module and the brake pedal module, the pedal casings may be prevented from interfering with each other.

In the popped-up state in which the accelerator pedal module and the brake pedal module may be projected from the pedal groove, the pedal casing may be in surface-contact with the foot rest panel, and when the driver manipulates the accelerator pedal module or the brake pedal module in the popped-up state, the weight of the driver may be supported by the pedal casing in surface-contact with the foot rest panel.

When the accelerator pedal module and the brake pedal module are switched from the hidden state into the popped-up state, the accelerator pedal module may be rotated rightward to be switched into the popped-up state and the brake pedal module may be rotated leftward to be switched into the popped-up state, and the accelerator pedal module and the brake pedal module in the popped-up state may be spaced from each other to prevent simultaneous manipulation of the accelerator pedal module and the brake pedal module.

A stopper guide may be integrally formed with the pedal groove; and in the hidden state in which the accelerator pedal module and the brake pedal module may be inserted into the pedal groove, the pedal casing may be supported while being brought into contact with the stopper guide and a gap may be formed between the pedal casing and the pedal groove to prevent the pedal pad from being compressed.

Furthermore, the foldable pedal apparatus for a vehicle according to an exemplary embodiment of the present disclosure may include: an accelerator pedal module and a brake pedal module provided on a foot rest panel to be rotatable in leftward and rightward directions, and configured to generate signals related to pedal functions thereof in response to manipulation of a driver, when the accelerator pedal module and the brake pedal module are switched from a hidden state into a popped-up state, the accelerator pedal module may be rotated rightward to be switched into the popped-up state and the brake pedal module may be rotated leftward to be switched into the popped-up state, and the accelerator pedal module and the brake pedal module in the popped-up state may be spaced from each other.

The foldable pedal apparatus according to an exemplary embodiment of the present disclosure is configured so that the accelerator pedal module and the brake pedal module that are operated in the pressure-manipulated type are popped-up in a manual driving mode so that the driver can manipulate the accelerator pedal module 100 and the brake pedal module 200, and in an autonomous driving mode, the accelerator pedal module 100 and the brake pedal module 200 are hidden so that the driver cannot manipulate the accelerator pedal module 100 and the brake pedal module 200. Accordingly, there are effects that the driver can relax in the autonomous driving mode, and moreover, erroneous manipulation of the pedals in the autonomous driving mode may be prevented, and safety improvement may be promoted.

The foldable pedal apparatus is configured to be manipulated in the pressure-manipulated type with the accelerator pedal module and the brake pedal module to generate the signals related to the pedal functions. Accordingly, there are effect that reduction of the number of parts thereof with simplification of the configuration, cost reduction, weight reduction, and size reduction with the compact configuration may be promoted, and the space required for foldable operation may be minimized through simplification of the foldable mechanism, and the usability of the indoor space of the vehicle may be maximized.

Furthermore, according to an exemplary embodiment of the present disclosure, the foldable pedal apparatus is the pressure-manipulated type pedal device which is easily manipulated and includes a simple configuration. Accordingly, there are effects that cost and weight reduction thereof may be promoted by reduction of the number of parts thereof and size reduction with the compact configuration.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
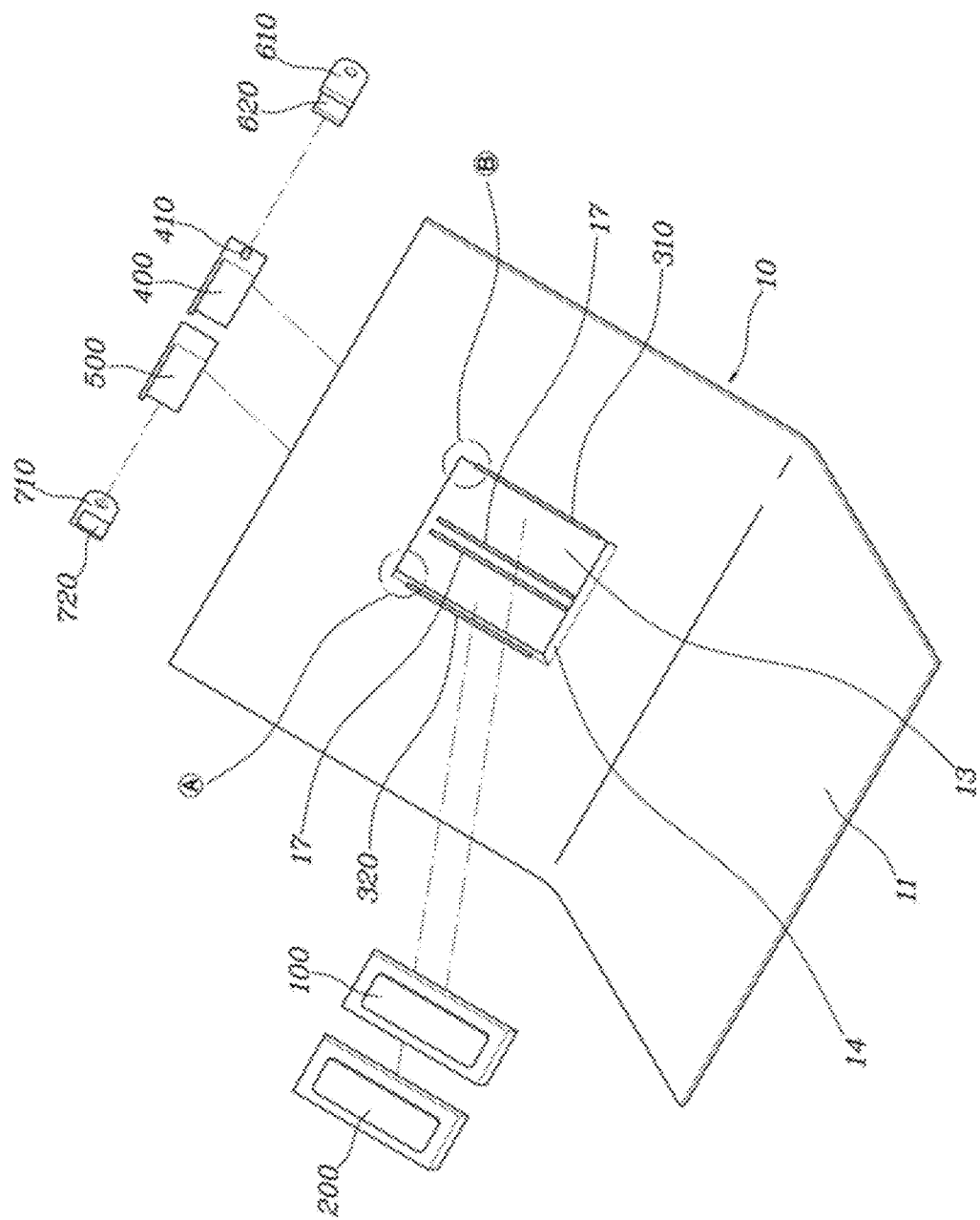
FIGS. 1A, 1B and 1C are exploded views showing a foldable pedal apparatus for a vehicle according to an exemplary embodiment of the present disclosure.
Figure 1B:
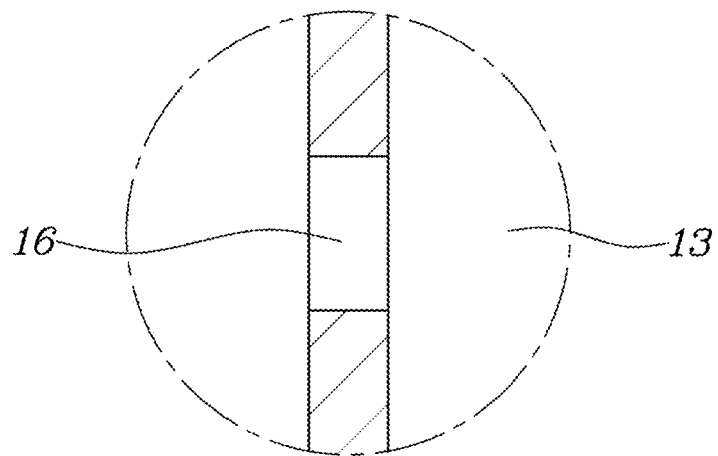
Figure 1C:
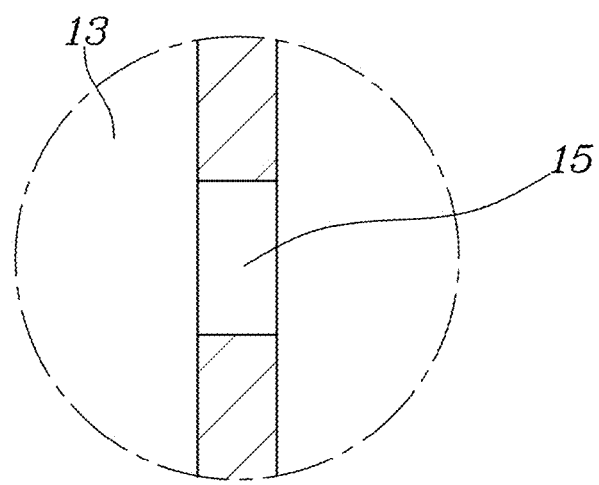
Figure 2:
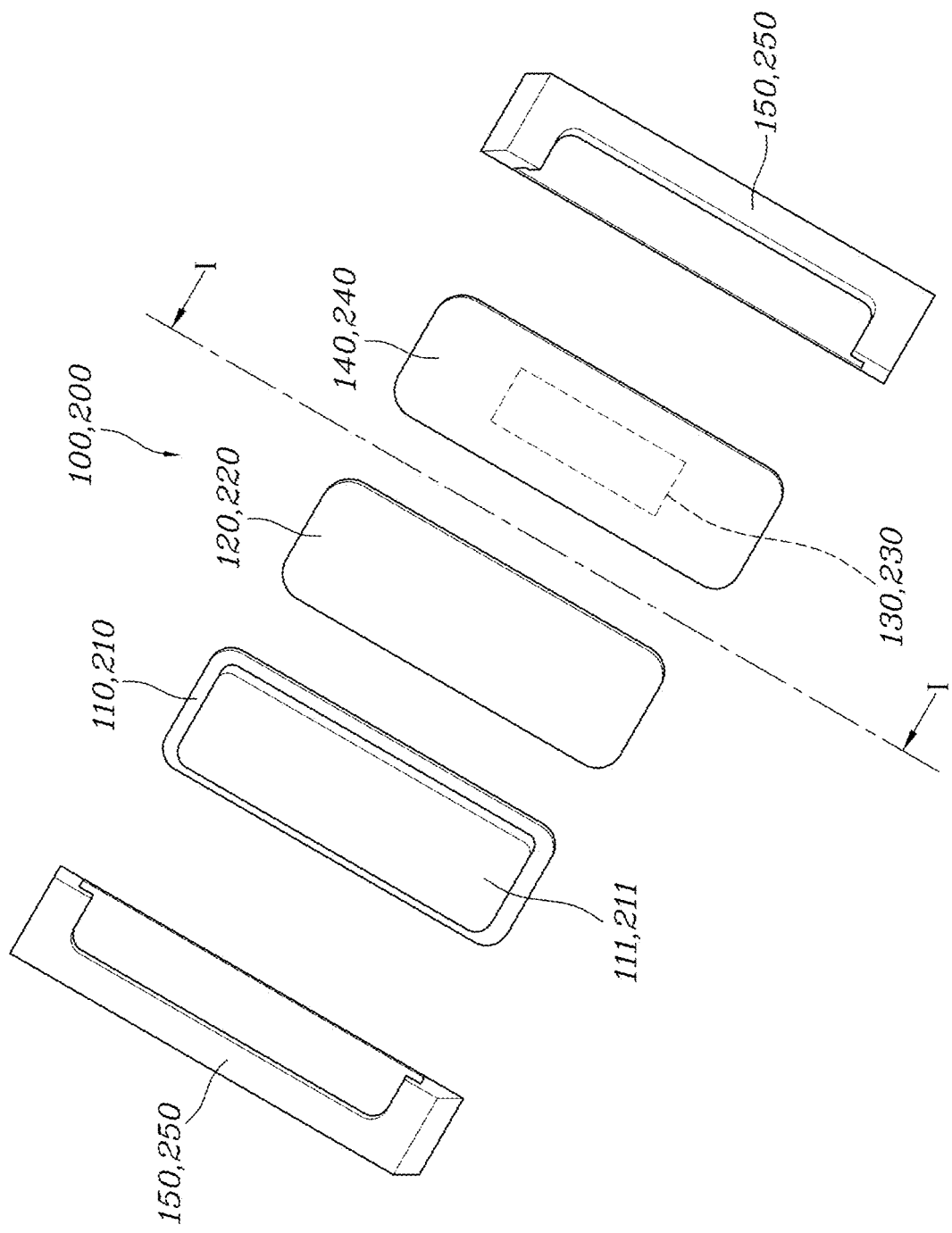
FIG. 2 is an exploded view showing an accelerator pedal module and a brake pedal module shown in FIG. 1A.
Figure 3:
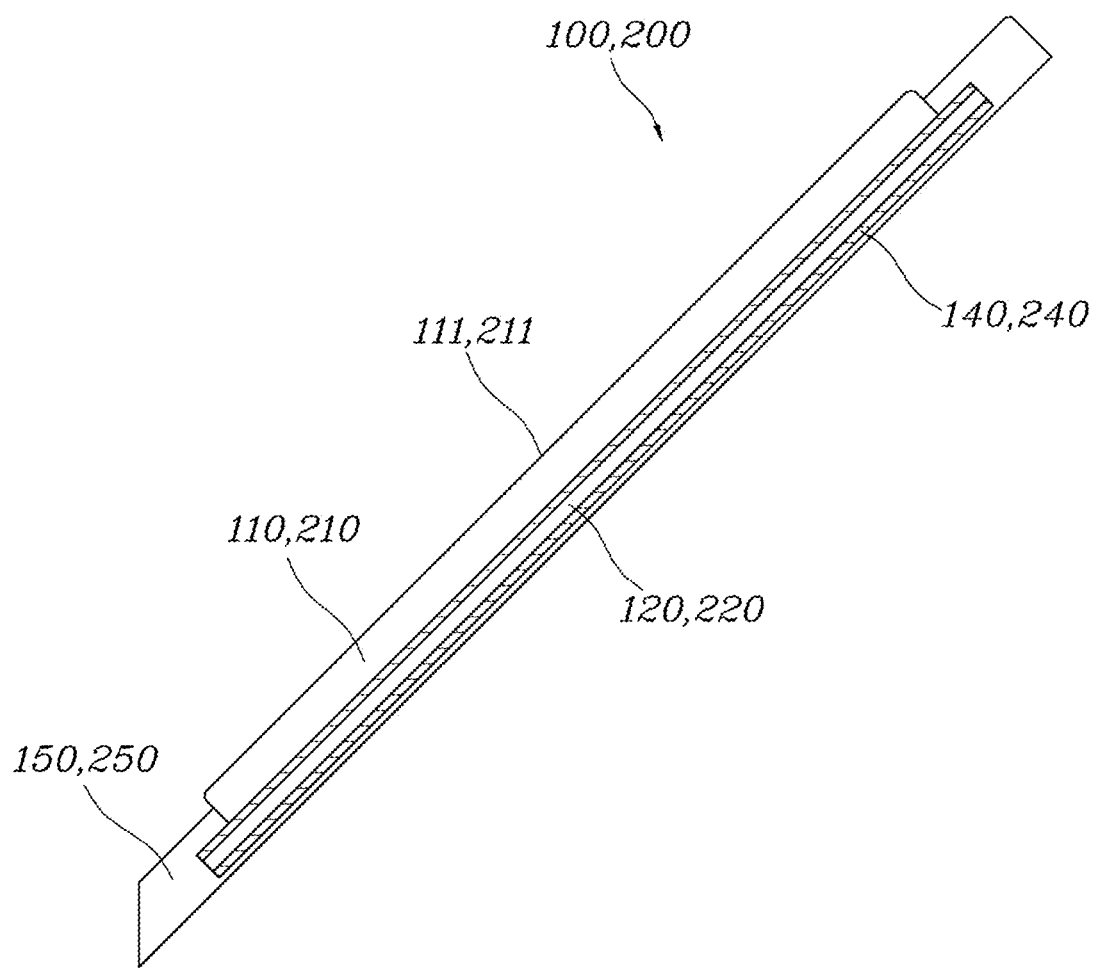
FIG. 3 is a sectional view I-I showing a coupling state of FIG. 2.
Figure 4:
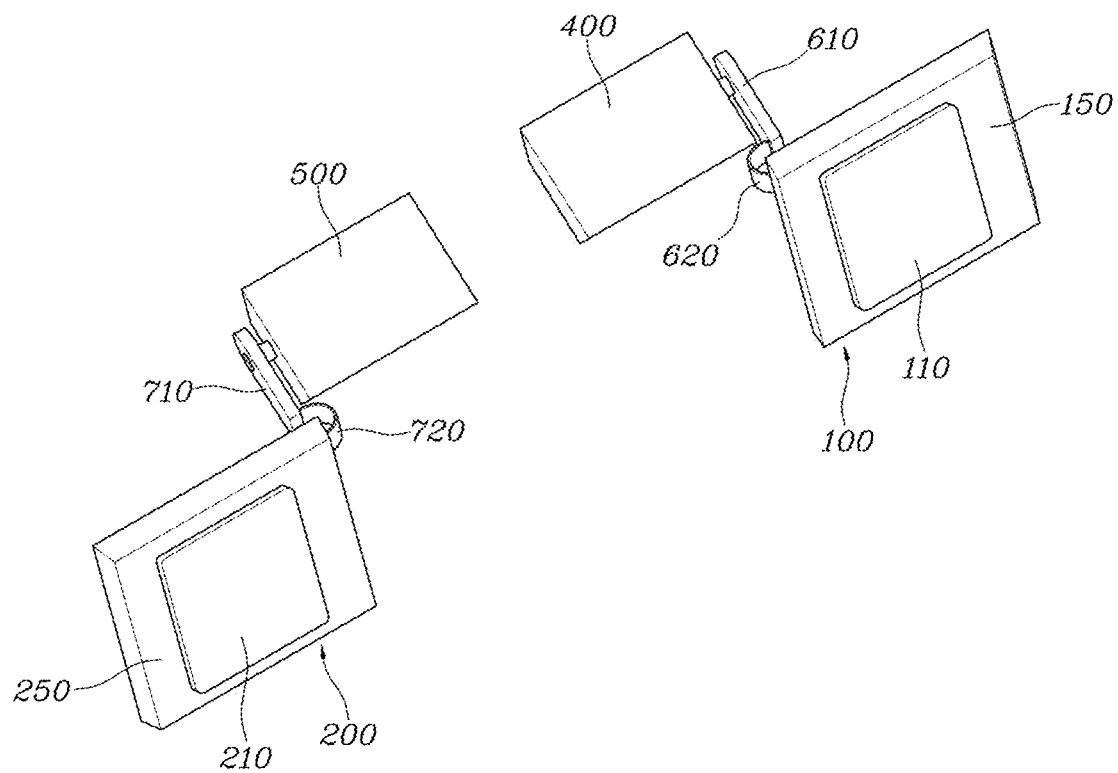
FIG. 4 is a view showing a state in which the accelerator pedal module and the brake pedal module are respectively connected to actuators.
Figure 5:
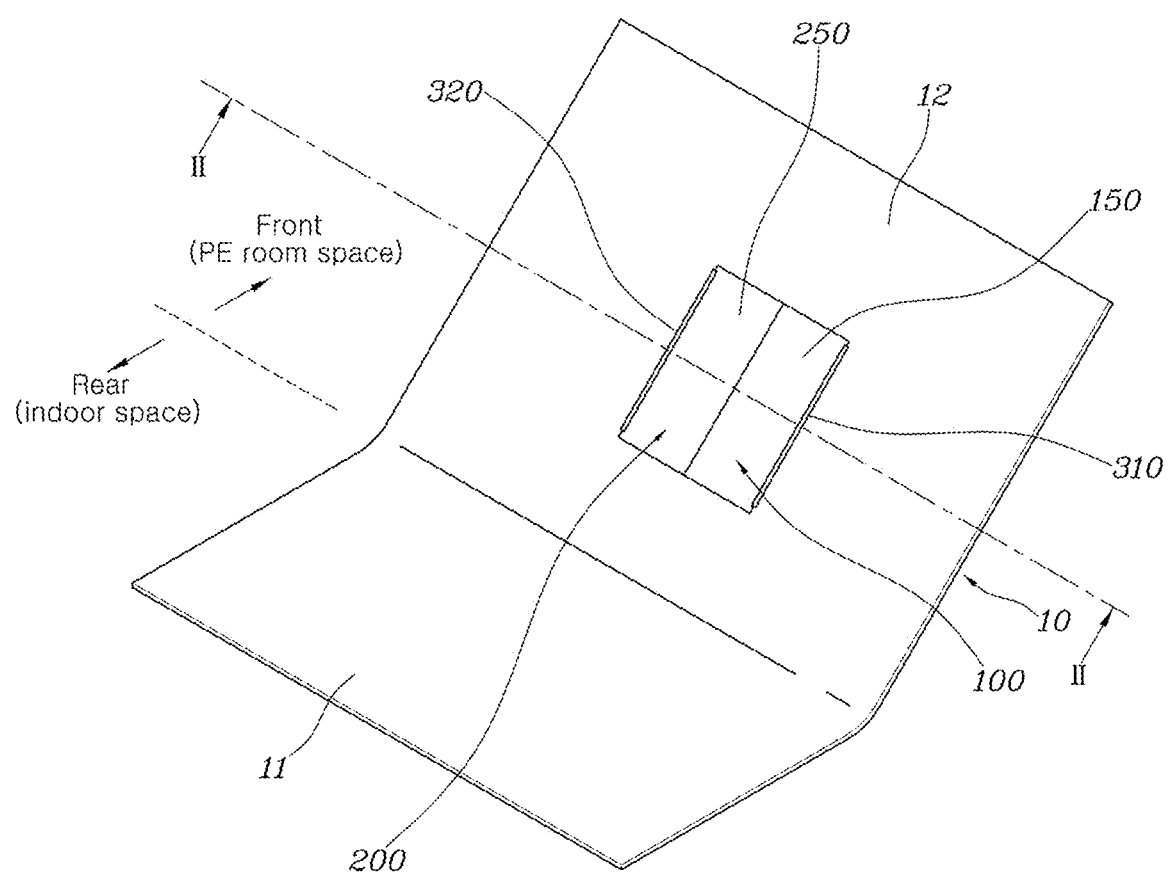
FIG. 5 is a view showing a hidden state of the accelerator pedal module and the brake pedal module according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, an exemplary embodiment of the present disclosure will be described in detail with reference to the accompanying drawings and the same or similar components are provided the same reference numerals regardless of the numbers of figures and are not repeatedly described.

Terms "module" and "unit" that are used for components in the following description are used only for the convenience of description without including discriminate meanings or functions.

In the following description, if it is decided that the detailed description of known technologies related to the present disclosure makes the subject matter of the exemplary embodiment described herein unclear, the detailed description is omitted.

Furthermore, the accompanying drawings are provided only for easy understanding of the exemplary embodiment included in the specification, and the technical spirit included in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be directly connected to or directly coupled to another element or be connected to or coupled to another element, including the other element intervening therebetween.

On the other hand, it should be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprise" or "have" used in the present specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that is configured to control a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Hereinbelow, with reference to accompanying drawings, a foldable pedal apparatus for a vehicle according to an exemplary embodiment of the present disclosure will be described.

According to an exemplary embodiment of the present disclosure, as shown in FIGS. 1 to 13, the foldable pedal apparatus includes an accelerator pedal module 100 and a brake pedal module 200 that are provided on a foot rest panel 10, which is located in a lower space of a driver's seat, to be rotatable in leftward and rightward opposite directions, operated in a pressure type, and generating signals related to pedal functions by manipulation of a driver.

The foot rest panel 10 includes a bottom surface 11, and an inclined surface 12 extending from the bottom surface 11 toward the front upper side, and the pedal groove 13 including a depressed groove shape is formed on the inclined surface 12.

When the accelerator pedal module 100 and the brake pedal module 200 are rotated to be inserted into the pedal groove 13 of the foot rest panel 10, the accelerator pedal module 100 and the brake pedal module 200 are in a hidden state to prevent manipulation of the accelerator pedal module 100 and the brake pedal module 200 by the driver (referring to FIGS. 5 to 8). When the accelerator pedal module 100 and the brake pedal module 200 are rotated to be projected from the pedal groove 13, the accelerator pedal module 100 and the brake pedal module 200 are exposed to the indoor space of the vehicle to be in a popped-up state from the pedal groove 13 to allow manipulation of the accelerator pedal module 100 and the brake pedal module 200 by the driver (referring to FIG. 9, FIG. 10, FIG. 11, FIG. 12, and FIG. 13).

When the accelerator pedal module 100 and the brake pedal module 200 are rotated to be in the hidden state according to an exemplary embodiment of the present disclosure, the accelerator pedal module 100 and the brake pedal module 200 are respectively rotated in directions in which a gap G therebetween narrows. When the accelerator pedal module 100 and the brake pedal module 200 are rotated to be in the popped-up state, the accelerator pedal module 100 and the brake pedal module 200 are respectively rotated in directions in which a gap therebetween widens.

Pedal hinges 310 and 320 are provided to rotate the accelerator pedal module 100 and the brake pedal module 200, and the accelerator pedal module 100 and the brake pedal module 200 are rotated on the pedal hinges 310 and 320, respectively.

The pedal hinges 310 and 320 are provided on right and left portions of the pedal groove 13 to be connected to the accelerator pedal module 100 and the brake pedal module 200, respectively.

The pedal hinges 310 and 320 may be formed in an injection manner to be integrated with the foot rest panel 10 or formed in a separate rotating structure such as a hinge.

Figure 12:
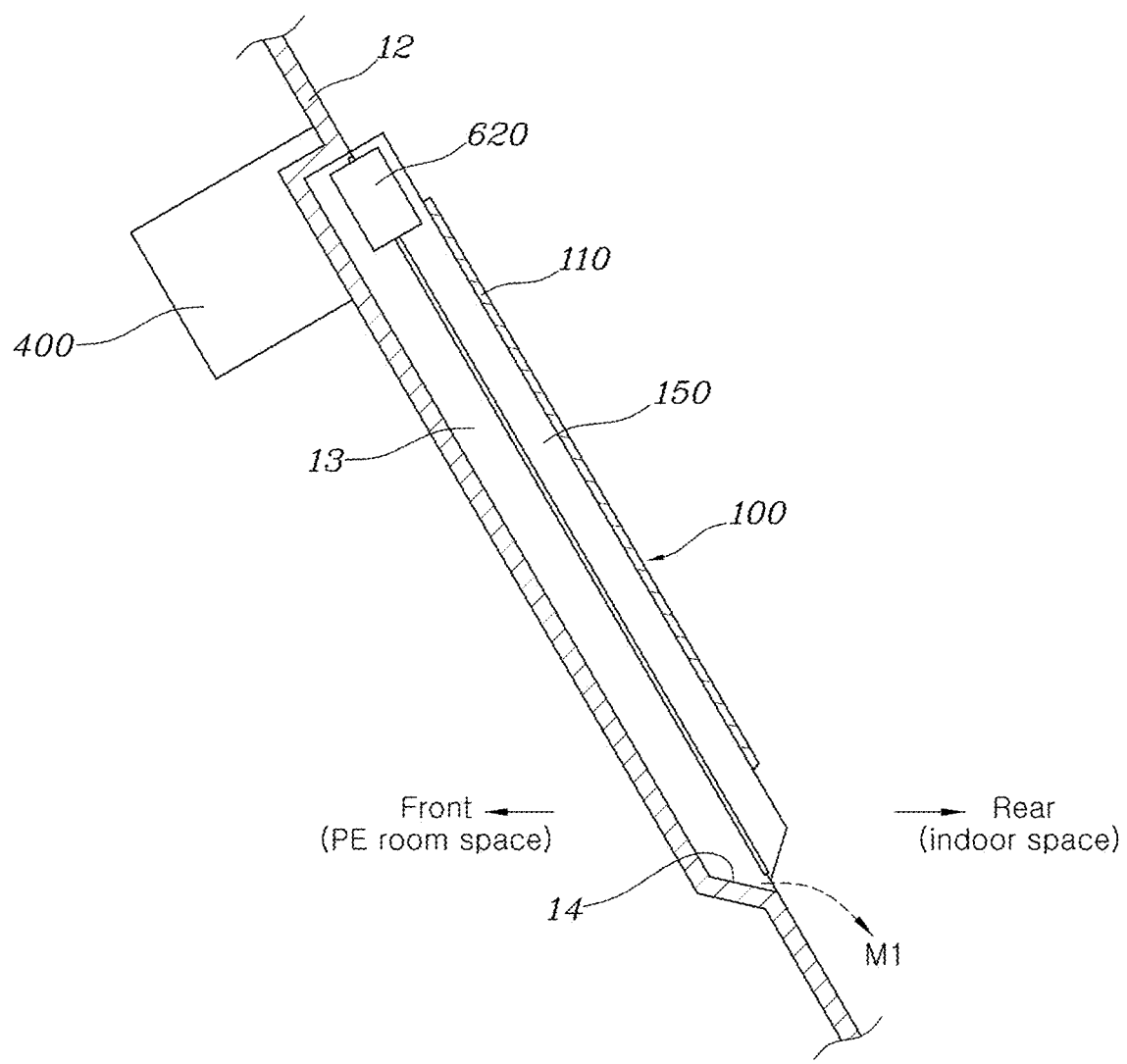

According to an exemplary embodiment of the present disclosure, a lower end portion of the pedal groove 13 is formed in an inclined surface 14 as shown in FIG. 12. Accordingly, when a foreign substance enters the inside space of the pedal groove 13, the foreign substance falls down by the weight thereof and is finally discharged outward through the inclined surface 14 (arrow M1), preventing disturbance of the foreign substance during the hiding operation and the popping-up operation of the accelerator pedal module 100 and the brake pedal module 200.

According to an exemplary embodiment of the present disclosure, the foldable pedal apparatus includes: an accelerator pedal actuator 400 and a brake pedal actuator 500 fixed on the foot rest panel 10 and including plungers 410 and 510, respectively, the plungers 410 and 510 being linearly moved: an accelerator pedal guide 610 coupled to the plunger 410 of the accelerator pedal actuator 400 and a brake pedal guide 710 coupled to the plunger 510 of the brake pedal actuator 500: an accelerator pedal leaf spring 620 connecting the accelerator pedal guide 610 and the accelerator pedal module 100 to each other and a brake pedal leaf spring 720 connecting the brake pedal guide 710 and the brake pedal module 200 to each other.

The accelerator pedal actuator 400 and the brake pedal actuator 500 are actuators linearly moved, and as an exemplary embodiment of the present disclosure, may include a linear motor or a solenoid.

When the accelerator pedal actuator 400 and the brake pedal actuator 500 are operated, the plungers 410 and 510 are projected forward or are moved back reversely, through the linear movement.

The accelerator pedal actuator 400 and the brake pedal actuator 500 are securely provided on a surface opposite to a surface where the pedal groove 13 is formed, of the foot rest panel 10.

In other words, the accelerator pedal actuator 400 and the brake pedal actuator 500 are securely provided at a front portion of the inclined surface 12 to be located in a front power electronics (PE) room based on the foot rest panel 10.

An electric vehicle is divided into a PE room and an indoor space based on the foot rest panel 10, and a space in front of the foot rest panel 10 is the PE room in which power electronics (PE) parts are located, and a space in rear of the foot rest panel 10 is the indoor space of the vehicle in which the driver is located.

The accelerator pedal guide 610 and the accelerator pedal leaf spring 620 are used to connect the plunger 410 of the accelerator pedal actuator 400 and the accelerator pedal module 100 to each other. The brake pedal guide 710 and the brake pedal leaf spring 720 are used to connect the plunger 510 of the brake pedal actuator 500 and the brake pedal module 200 to each other.

The accelerator pedal guide 610 and the brake pedal guide 710 are used to overcome a locational difference of the connection structure.

Each of the accelerator pedal leaf spring 620 and the brake pedal leaf spring 720 stays in a bent state of an arc shape in normal time when an external force is not applied, and when an external force is applied, each of the accelerator pedal leaf spring 620 and the brake pedal leaf spring 720 is unfolded in a straight line shape, and when the external force is removed, each of the accelerator pedal leaf spring 620 and the brake pedal leaf spring 720 is recovered to the bent state of the arc shape.

To connect each of the accelerator pedal leaf spring 620 and the brake pedal leaf spring 720 to the accelerator pedal module 100 and the brake pedal module 200, slot holes 15 and 16 are respectively form on right and left portions of the pedal groove 13, and the accelerator pedal leaf spring 620 and the brake pedal leaf spring 720 are respectively connected to the accelerator pedal module 100 and the brake pedal module 200 through the slot holes 15 and 16.

Figure 6:
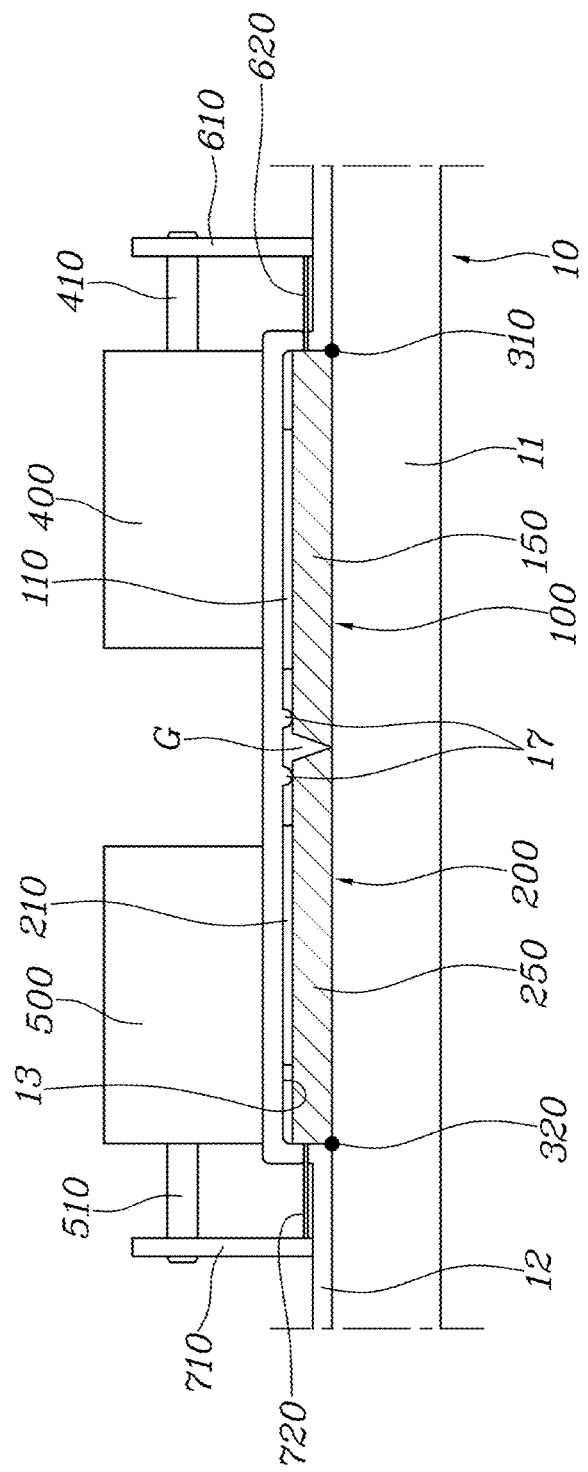
FIG. 6 is a transverse-sectional view II-II of FIG. 5.

When looking at FIG. 6 for a reference, in the hidden state in which the accelerator pedal module 100 and the brake pedal module 200 are inserted into the pedal groove 13, the plunger 410 of the accelerator pedal actuator 400 and the plunger 510 of the brake pedal actuator 500 are moved forward to be projected, and the accelerator pedal guide 610 and the brake pedal guide 710 are respectively moved rightward and leftward by the plungers 410 and 510, and the accelerator pedal leaf spring 620 and the brake pedal leaf spring 720 are unfolded in the straight line shapes by pulling of the accelerator pedal guide 610 and the brake pedal guide 710.

As described above, when the accelerator pedal leaf spring 620 and the brake pedal leaf spring 720 are deformed to be unfolded in the straight line shapes, the accelerator pedal module 100 and the brake pedal module 200 are pulled to be rotated on the pedal hinges 310 and 320 to be finally in the hidden state in which the accelerator pedal module 100 and the brake pedal module 200 are inserted into the pedal groove 13.

Figure 11:
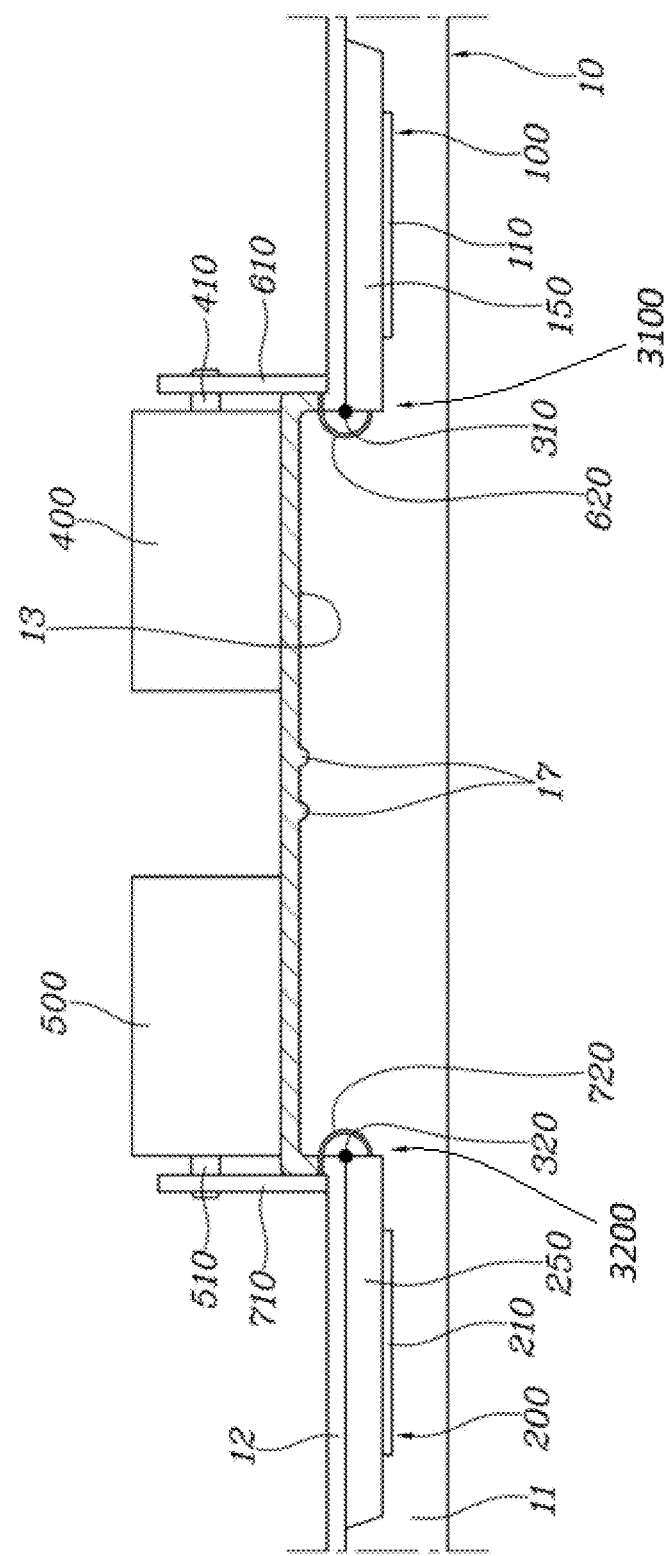

Furthermore, when looking at FIG. 11 for a reference, when the accelerator pedal module 100 and the brake pedal module 200 are in the popped-up state in which the accelerator pedal module 100 and the brake pedal module 200 are projected from the pedal groove 13, the plunger 410 of the accelerator pedal actuator 400 and the plunger 510 of the brake pedal actuator 500 are respectively moved to be retreated, and the accelerator pedal guide 610 and the brake pedal guide 710 are moved leftward and rightward by the plungers 410 and 510 to be moved toward the accelerator pedal actuator 400 and the brake pedal actuator 500, and the accelerator pedal leaf spring 620 and the brake pedal leaf spring 720 are respectively recovered into the arc-shaped bent state as the pulling forces of the accelerator pedal guide 610 and the brake pedal guide 710 are removed.

As described above, when the accelerator pedal leaf spring 620 and the brake pedal leaf spring 720 are recovered to the arc-shaped bent state, pushing forces due to recovery of the accelerator pedal leaf spring 620 and the brake pedal leaf spring 720 are applied to the accelerator pedal module 100 and the brake pedal module 200 and the accelerator pedal module 100 and the brake pedal module 200 are rotated on the pedal hinges 310 and 320, and to be finally in the popped-up state in which the accelerator pedal module 100 and the brake pedal module 200 are projected from the pedal groove 13.

In the popped-up state, only the accelerator pedal module 100 and the brake pedal module 200 including slim thicknesses are projected to the indoor space, so that the usability of the indoor space of the vehicle may be maximized, which is an advantage.

According to an exemplary embodiment of the present disclosure, although a part of the shape of the accelerator pedal module 100 and a part of the shape of the brake pedal module 200 operated in the pressure type may be slightly different, the accelerator pedal module 100 and the brake pedal module 200 include a same entire structures.

In other words, the accelerator pedal module 100 and the brake pedal module 200 include: pedal pads 110 and 210 manipulated by the driver: elastic dampers 120 and 220 respectively stacked under the pedal pads 110 and 210: pressure sensors 130 and 230 stacked under the elastic dampers 120 and 220, and generating electric signals when being brought into contact with the elastic dampers 120 and 220 due to manipulation of the pedal pads 110 and 210: printed circuit boards (PCBs) 140 and 240 receiving the signals of the pressure sensors 130 and 230 to generate signals related to pedal functions, respectively; and pedal casings 150 and 250 covering the pedal pads 110 and 210, the elastic dampers 120 and 220, and the PCBs 140 and 240, and connected to the accelerator pedal leaf spring 620 and the brake pedal leaf spring 720, respectively.

The elastic dampers 120 and 220 may be made up rubber or sponge, and when the driver manipulates the pedal pads 110 and 210, the elastic dampers 120 and 220 transfers a load to the pressure sensors 130 and 230, and may deliver smooth manipulation feeling to the driver.

As described in the exemplary embodiment of the present disclosure, the pressure sensors 130 and 230 may be integrally provided with the PCBs 140 and 240 or may be formed in separate objects to be assembled.

When the driver steps on and manipulates the pedal pads 110 and 210, the pedal pads 110 and 210 are pressed, and the pedal pads 110 and 210 compress the elastic dampers 120 and 220. At the instant time, a manipulation force of the driver is transmitted to the PCBs 140 and 240 including the pressure sensors 130 and 230, and the PCBs 140 and 240 recognize the manipulation force (degree of pressing) to output a pedal manipulation signal (accelerating signal or braking signal) and transmit the signal to a vehicle controller.

The PCB 140 of the accelerator pedal module 100 receives the electric signal of the pressure sensor 130 to generate a signal related to acceleration, and the PCB 240 of the brake pedal module 200 receives the electric signal of the pressure sensor 230 to generate a signal related to braking.

As a force of the driver stepping on the pedal pads 110 and 210 increases, a force of the elastic dampers 120 and 220 pressing the pressure sensors 130 and 230 increases and a large voltage may be generated.

Driver's manipulation surfaces 111 and 211 of the pedal pads 110 and 210 are projected from the pedal casings 150 and 250 to enable the driver to manipulate the pedal pads 110 and 210 by pressing only the pedal pads 110 and 210.

The pedal hinges 310 and 320 provided on right and left portions of the pedal groove 13 are respectively connected to an edge of an end portion of the pedal casing 150 of the accelerator pedal module 100 and an edge of an end portion of the pedal casing 250 of the brake pedal module 200. Therefore, as shown in FIG. 6, in the hidden state in which the accelerator pedal module 100 and the brake pedal module 200 are inserted into the pedal groove 13, the pedal casings 150 and 250 are prevented from being projected out of the pedal groove 13, whereby the esthetic of the external appearance thereof may be improved.

Furthermore, the accelerator pedal leaf spring 620 is connected to the pedal casing 150 of the accelerator pedal module 100 and the brake pedal leaf spring 720 is connected to the pedal casing 250 of the brake pedal module 200. The accelerator pedal leaf spring 620 is connected to a location spaced from the pedal hinge 310 and the brake pedal leaf spring 720 is connected to a location spaced from the pedal hinge 320.

As described above, when the accelerator pedal leaf spring 620 and the brake pedal leaf spring 720 are connected to the locations of the pedal casings 150 and 250 to be spaced from the pedal hinges 310 and 320, respectively, powers of the actuators are transmitted to the leaf springs so that the pedal casings 150 and 250 may be efficiently rotated when the leaf springs receive loads.

As shown in FIG. 6, when the accelerator pedal module 100 and the brake pedal module 200 are in the hidden state in which the accelerator pedal module 100 and the brake pedal module 200 are inserted into the pedal groove 13, side surfaces of the pedal casings 150 and 250 connected to the pedal hinges 310 and 320 are maintained in a contact state with side surfaces of the pedal groove 13.

As described above, in the hidden state, when the one side surfaces of the pedal casings 150 and 250 are supported while being brought into contact with the side surfaces of the pedal groove 13, even when an external force is applied to the pedal casings 150 and 250 as the driver steps on the pedal casings 150 and 250, the pedal casings 150 and 250 are prevented from being rotated into the pedal groove 13. Accordingly, erroneous operation in which the pedal pads 110 and 210 are pressed is prevented to prevent unintended generation of the pedal signal (accelerating signal or braking signal).

Furthermore, it is possible to provide configuration in which a stopper guide 17 formed in the pedal groove 13 is used to support the pedal casings 150 and 250 in the hidden state.

The stopper guide 17 is configured to extend from a middle location of the pedal groove 13 in a longitudinal direction, protrudes rearward thereof, and includes two stopper guides that are formed in parallel to each other.

The stopper guide 17 may be configured to be integrally formed with the foot rest panel 10 or to be formed in a separate object to be securely coupled to the pedal groove 13.

As shown in FIG. 6, in the hidden state in which the accelerator pedal module 100 and the brake pedal module 200 are inserted into the pedal groove 13, the pedal casings 150 and 250 are supported while being brought into contact with the stopper guide 17, and even when an external force is applied to the pedal casings 150 and 250 as the driver steps on the pedal casings 150 and 250, the pedal casings 150 and 250 are prevented from being rotated into the pedal groove 13, by supporting of the stopper guide 17. Accordingly, erroneous operation in which the pedal pads 110 and 210 are pressed is prevented and unintended generation of the pedal signal may be prevented (accelerating signal or braking signal).

Furthermore, in the hidden state in which the accelerator pedal module 100 and the brake pedal module 200 are inserted into the pedal groove 13, the pedal casings 150 and 250 are supported while being brought into contact with the stopper guide 17. At the instant time, to prevent the pedal pads 110 and 210 to be pressurized, a gap including a predetermined size between the pedal casings 150 and 250 and the pedal groove 13 may be formed. Accordingly, erroneous operation in which the pedal pads 110 and 210 are pressed may be prevented and unintended generation of the pedal signal (accelerating signal or braking signal) may be prevented.

As an exemplary embodiment of the present disclosure, with a control logic, it may be configured to prevent unintended generation of the pedal signal in the hidden state.

In other words, when the operation signal of each of the pedal pads 110 and 210 is generated in the hidden state in which the accelerator pedal module 100 and the brake pedal module 200 are inserted into the pedal groove 13, the control logic of each of the PCBs 140 and 240 is designed to ignore the operation signal generated at the instant time to prevent generation of the signal related to the pedal function.

Figure 7:
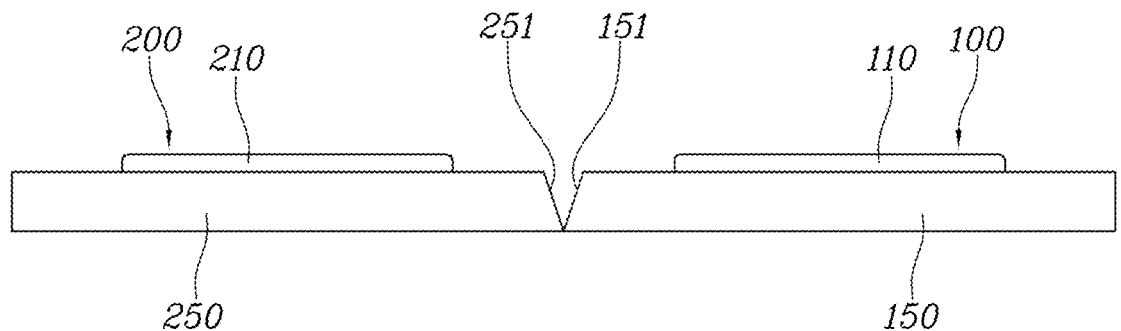
FIG. 7 is a view showing the accelerator pedal module and the brake pedal module in the hidden state.

FIG. 7 is a view showing the accelerator pedal module 100 and the brake pedal module 200 in the hidden state. In the hidden state, one side surface of the pedal casing 150 of the accelerator pedal module 100 and one side surface of the pedal casing 250 of the brake pedal module 200 are respectively formed in inclined surfaces 151 and 251, the surfaces facing each other. Accordingly, in the popping-up operation of the accelerator pedal module 100 and the brake pedal module 200, interruption between the pedal casings 150 and 250 is prevented to allow the accelerator pedal module 100 and the brake pedal module 200 to efficiently perform the popping-up operations.

Referring to FIG. 11, in the popped-up state in which the accelerator pedal module 100 and the brake pedal module 200 are projected from the pedal groove 13, the pedal casing 150 of the accelerator pedal module 100 and the pedal casing 250 of the brake pedal module 200 are brought into surface-contact with the inclined surface 12 of the foot rest panel 10.

Therefore, when the driver manipulates the accelerator pedal module 100 or the brake pedal module 200 in the popped-up state, the weight of the driver is supported by the pedal casing 150, 250 in surface-contact with the inclined surface 12 of the foot rest panel 10 to prevent movement of the accelerator pedal module 100 or the brake pedal module 200. Accordingly, the driver can stably step on the accelerator pedal module 100 or the brake pedal module 200 to manipulate the accelerator pedal module 100 or the brake pedal module 200.

Figure 13:
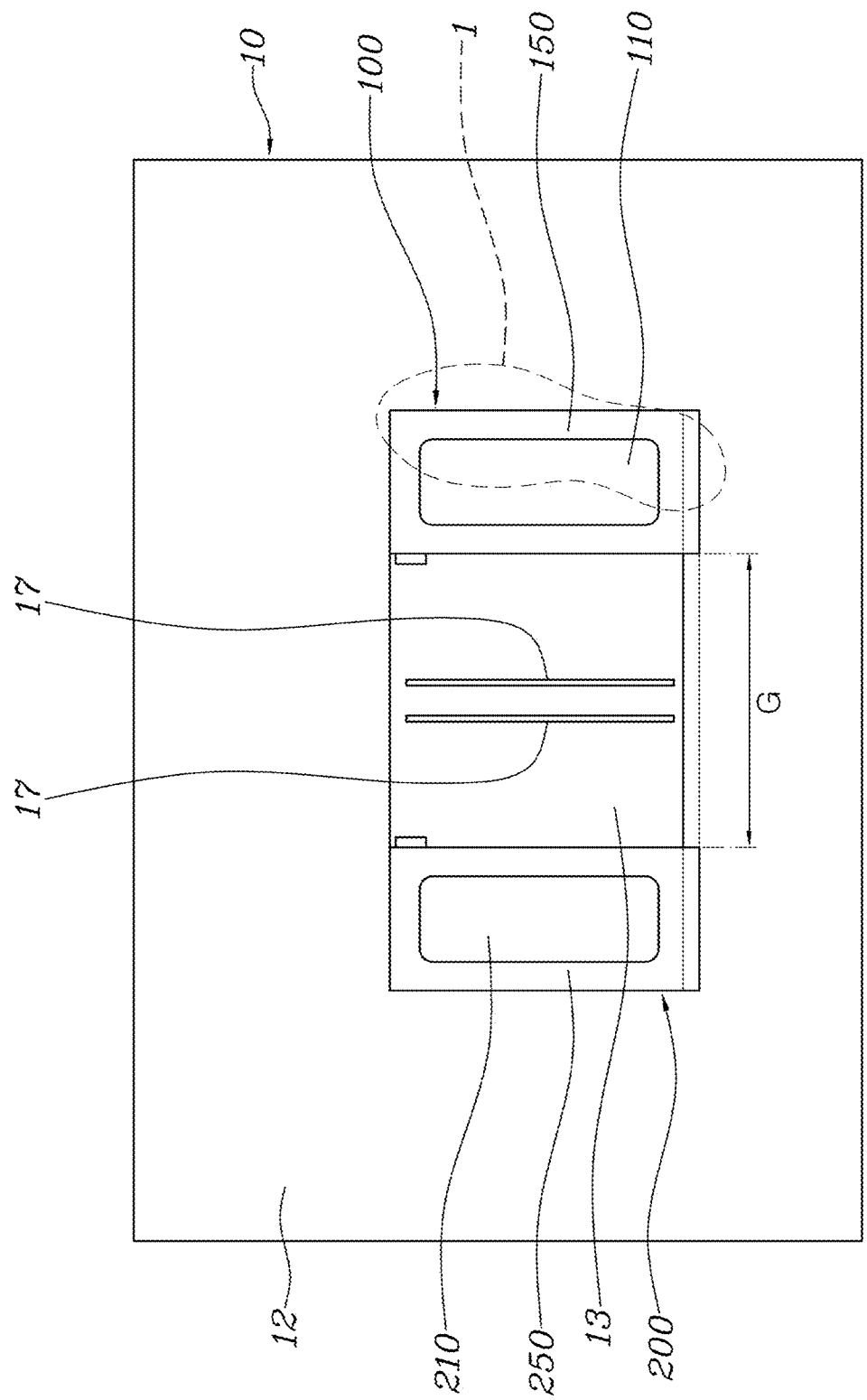
FIG. 13 is a view showing a state in which the driver's foot manipulates the accelerator pedal module in the popped-up state.

In the exemplary embodiment of the present disclosure, when the accelerator pedal module 100 and the brake pedal module 200 are switched from the hidden state to the popped-up state, the accelerator pedal module 100 is rotated rightward on the pedal hinge 310 at a first portion 3100 of the pedal groove 13 to be popped up and the brake pedal module 200 is rotated leftward on the pedal hinge 320 at a second portion 3200 of the pedal groove 13 to be popped up. As shown in FIG. 13, as the accelerator pedal module 100 and the brake pedal module 200 in the popped-up state are sufficiently spaced from each other, simultaneous manipulation of the accelerator pedal module 100 and the brake pedal module 200 are prevented, whereby prevention of erroneous operation and the safety according to pedal operation are improved.

FIG. 13 is a view showing a driver's foot 1 stepping on and manipulating the accelerator pedal module 100 in the popped-up state. In the popped-up state, as the accelerator pedal module 100 and the brake pedal module 200 are sufficiently spaced from each other, the driver's foot 1 manipulates only the accelerator pedal module 100, and does not perform simultaneous manipulation of the accelerator pedal module 100 and the brake pedal module 200.

Figure 8:
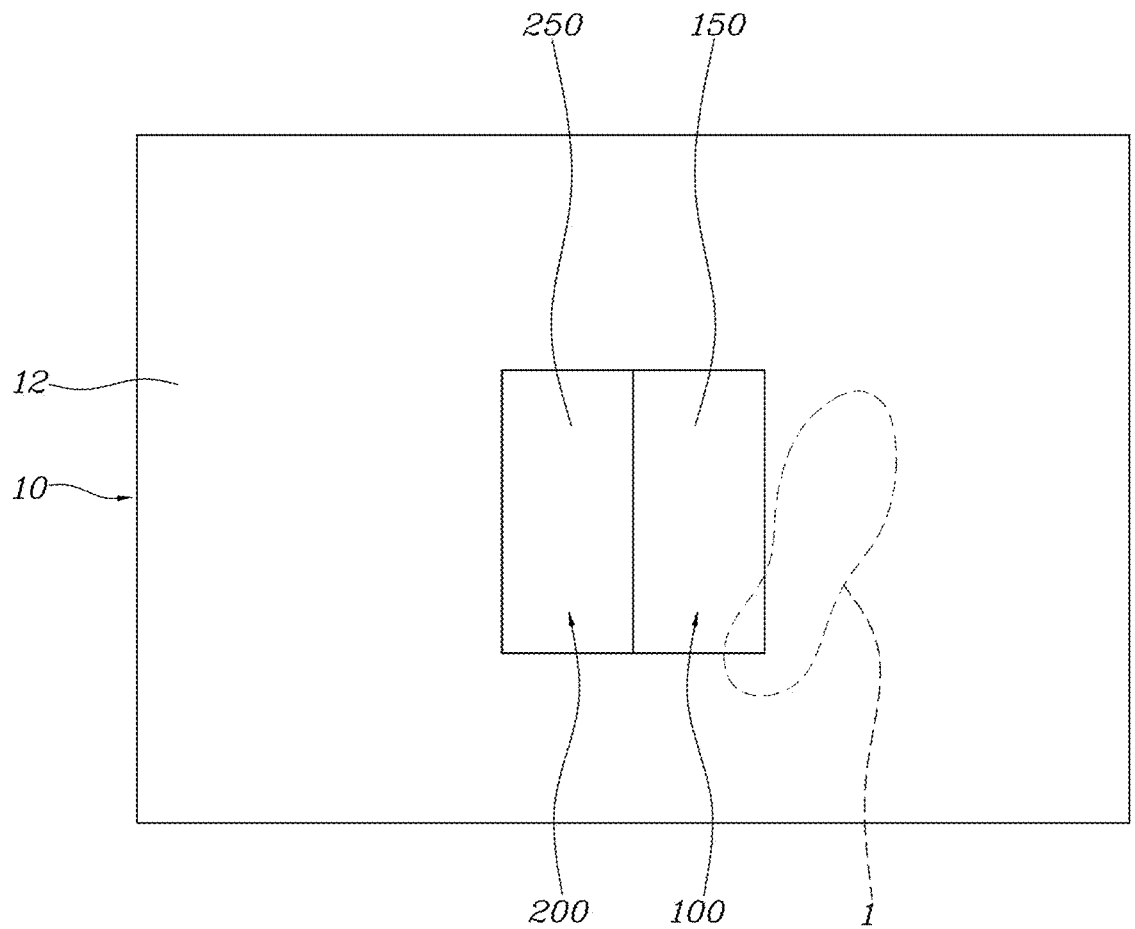
FIG. 8 is a view showing a driver's foot which is supported on a foot rest in the hidden state.
Figure 9:
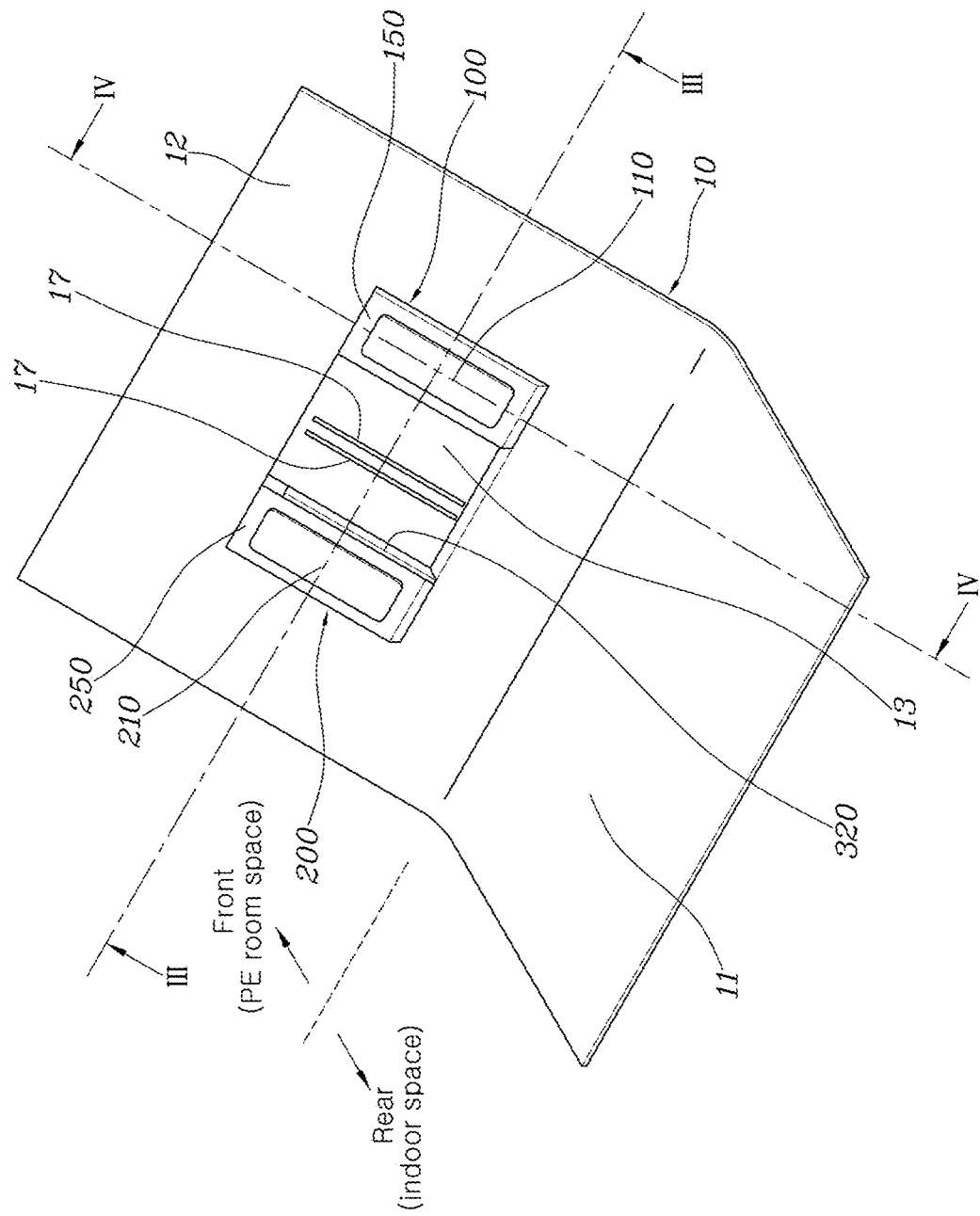
FIG. 9 is a view showing a popped-up state of the accelerator pedal module and the brake pedal module according to an exemplary embodiment of the present disclosure.
Figure 10:
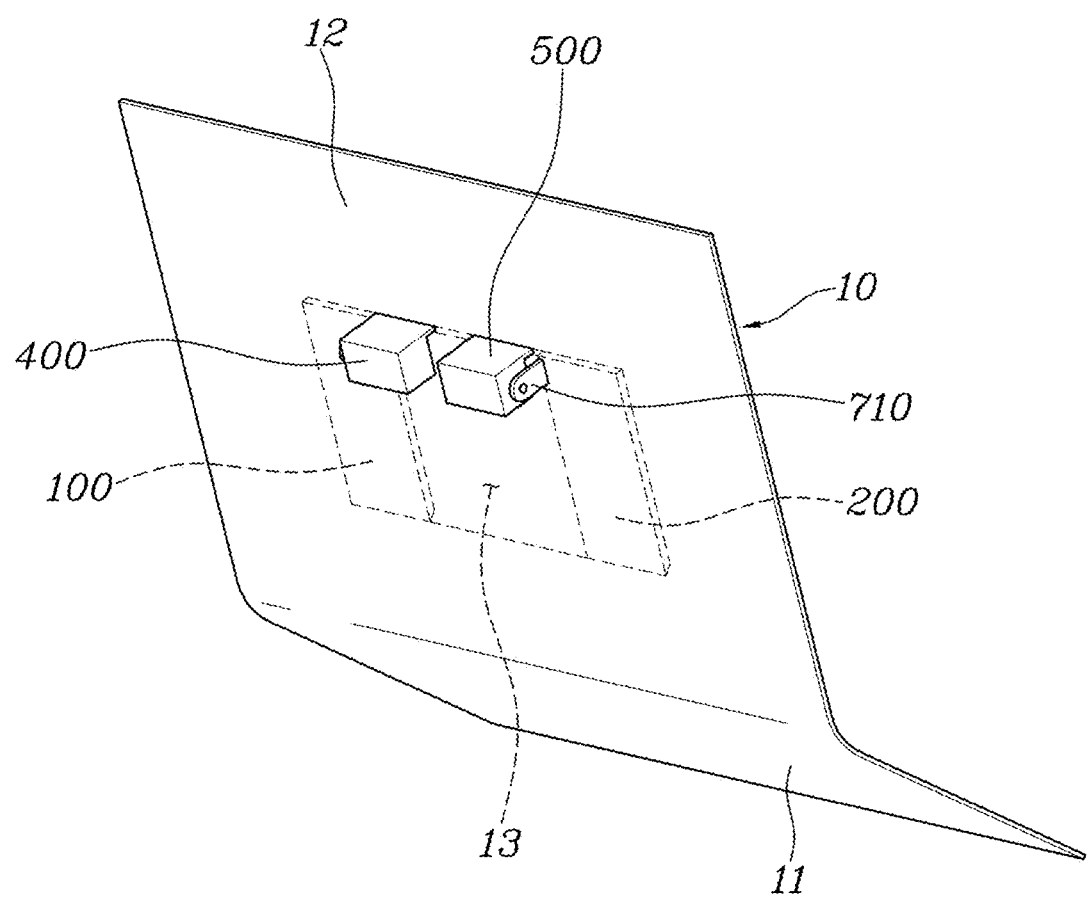
FIG. 10 is a front view of FIG. 9, FIG. 11 and FIG. 12 are a transverse-sectional view and a longitudinal-sectional III-III view of FIG. 9.

FIG. 8 is a view showing the accelerator pedal module 100 and the brake pedal module 200 in the hidden state, and at the instant time, the driver's foot 1 may take a rest in comfortable conditions while being located in the inclined surface 12 of the foot rest panel 10.

In the exemplary embodiment of the present disclosure, the PCB including a flexible film shape may be applied to the pedal hinge 310, 320, and in the instant case, the PCB 140, 240 generates the signal as the driver manipulates the accelerator pedal module 100 or the brake pedal module 200, the signal of the PCB 140, 240 is transmitted to the vehicle controller through the PCB of the pedal hinge 310, 320 including a film shape.

As described above, the foldable pedal apparatus according to an exemplary embodiment of the present disclosure is configured so that the accelerator pedal module 100 and the brake pedal module 200 that are operated in the pressure-manipulated type are popped-up in a manual driving mode so that the driver can manipulate the accelerator pedal module 100 and the brake pedal module 200. In an autonomous driving mode, the accelerator pedal module 100 and the brake pedal module 200 are hidden so that the driver cannot manipulate the accelerator pedal module 100 and the brake pedal module 200. In the autonomous driving mode, the driver can relax, and moreover, erroneous manipulation of the pedals in the autonomous driving mode is prevented, so that the improvement in safety may be promoted, which are advantages.

According to an exemplary embodiment of the present disclosure, the foldable pedal apparatus is configured to be manipulated in the pressure-manipulated type with the accelerator pedal module 100 and the brake pedal module 200 to generate the signals related to the pedal functions, and reduction of the number of parts with simplification of the configuration, cost reduction, weight reduction, and size reduction with the compact configuration may be promoted, and the space required for folding operation may be minimized through simplification of foldable mechanism, so that the usability of the indoor space of the vehicle may be maximized, which is an advantage.

Furthermore, according to an exemplary embodiment of the present disclosure, the foldable pedal apparatus is the pressure-manipulated type pedal device which is easily manipulated and includes a simple configuration, whereby cost and weight reduction through reduction of the number of parts and size reduction through the compact configuration may be promoted, which are advantages.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle, the foldable pedal apparatus comprising:
   an accelerator pedal module and a brake pedal module provided on a foot rest panel to be rotatable in leftward and rightward directions, and configured to generate signals related to pedal functions thereof in response to manipulation of a driver;
   an accelerator pedal actuator and a brake pedal actuator that are fixed to the foot rest panel and include plungers, respectively, the plungers being linearly moved;
   an accelerator pedal guide coupled to the plunger of the accelerator pedal actuator and a brake pedal guide coupled to the plunger of the brake pedal actuator; and
   an accelerator pedal spring connecting the accelerator pedal guide and the accelerator pedal module to each other and a brake pedal spring connecting the brake pedal guide and the brake pedal module to each other,
   wherein when the accelerator pedal module and the brake pedal module are rotated to be inserted into a pedal groove formed in the foot rest panel, the accelerator pedal module and the brake pedal module are in a hidden state to prevent manipulation of the accelerator pedal module and the brake pedal module by the driver, and when the accelerator pedal module and the brake pedal module are rotated to be projected from the pedal groove, the accelerator pedal module and the brake pedal module are in a popped-up state to allow manipulation of the accelerator pedal module and the brake pedal module by the driver.

2. The foldable pedal apparatus of claim 1, wherein when the accelerator pedal module and the brake pedal module are rotated to be into the hidden state, the accelerator pedal module and the brake pedal module are rotated in directions in which a gap therebetween narrows, and when the accelerator pedal module and the brake pedal module are rotated into the popped-up state, the accelerator pedal module and the brake pedal module are rotated in directions in which the gap therebetween widens.

3. The foldable pedal apparatus of claim 1,
   wherein the pedal groove is formed on an inclined surface of the foot rest panel.

4. The foldable pedal apparatus of claim 1, wherein a lower end portion of the pedal groove is formed in an inclined surface.

5. The foldable pedal apparatus of claim 1,
   wherein the accelerator pedal actuator and the brake pedal actuator are securely provided on a surface opposite to a surface where the pedal groove is formed, of the foot rest panel, and
   wherein the accelerator pedal spring and the brake pedal spring are provided through slot holes formed on the foot rest penal in first and second portions of the pedal groove.

6. The foldable pedal apparatus of claim 1, wherein when the accelerator pedal module and the brake pedal module are in the popped-up state in which each of the accelerator pedal module and the brake pedal module is projected from the pedal groove, the accelerator pedal guide and the brake pedal guide are in a state in which the accelerator pedal guide and the brake pedal guide are moved toward the accelerator pedal actuator and the brake pedal actuator, respectively, and the accelerator pedal spring and the brake pedal spring are bent in arc shapes.

7. The foldable pedal apparatus of claim 1, wherein when the accelerator pedal module and the brake pedal module is in the hidden state in which each of the accelerator pedal module and the brake pedal module is inserted into the pedal groove, the accelerator pedal guide and the brake pedal guide are in a state in which the accelerator pedal guide and the brake pedal guide are moved to be spaced from the accelerator pedal actuator and the brake pedal actuator, respectively, and the accelerator pedal spring and the brake pedal spring are in a state in which the accelerator pedal guide and the brake pedal guide are unfolded in straight shapes.

8. The foldable pedal apparatus of claim 1, wherein each of the accelerator pedal module and the brake pedal module includes:
   a pedal pad operated in a pressure type, including a same configuration for the accelerator pedal module and the brake pedal module, and configured to be manipulated in response to the driver's operation;
   an elastic damper stacked with a lower portion of the pedal pad;
   a printed circuit board (PCB) stacked with a lower portion of the elastic damper, and including a pressure sensor configured to generate an electric signal when being brought into contact with the elastic damper by manipulation of the pedal pad, and receiving the signal of the pressure sensor to generate a signal related to each pedal function of the accelerator pedal module and the brake pedal module; and
   a pedal casing covering the pedal pad, the elastic damper, and the PCB, and connected to each of the accelerator pedal spring and the brake pedal leaf spring.

9. The foldable pedal apparatus of claim 8, wherein a driver's manipulation surface in the pedal pad is projected from the pedal casing to enable the driver to steps on and manipulate only the pedal pad.

10. The foldable pedal apparatus of claim 8, wherein pedal hinges are respectively provided on first and second portions of the pedal groove, and each of the pedal hinges is connected to the pedal casing, and wherein in the hidden state in which the accelerator pedal module and the brake pedal module are inserted into the pedal groove, the pedal casing is prevented from being projected out of the pedal groove.

11. The foldable pedal apparatus of claim 10, wherein in the hidden state in which the accelerator pedal module and the brake pedal module are inserted into the pedal groove, a surface of the pedal casing where each of the pedal hinges is connected is brought into contact with a side surface of the pedal groove, respectively, and while the surface of the pedal casing and the side surface of the pedal groove are in contact with each other, even when an external force is applied to the pedal casing, the pedal casing is prevented from being rotated into the pedal groove.

12. The foldable pedal apparatus of claim 8,
wherein pedal hinges are respectively provided on first and second portions of the pedal groove, and each of the pedal hinges is connected to the pedal casing, and
wherein each of the accelerator pedal spring and the brake pedal spring is connected to a location of the pedal casing to be spaced from each of the pedal hinges.

13. The foldable pedal apparatus of claim 8,
wherein a stopper guide is integrally formed with the pedal groove, and
wherein in the hidden state in which the accelerator pedal module and the brake pedal module are inserted into the pedal groove, the pedal casing is brought into contact with the stopper guide so that even when external force is applied to the pedal casing, the pedal casing is prevented from being rotated into the pedal groove.

14. The foldable pedal apparatus of claim 8, wherein in the hidden state in which the accelerator pedal module and the brake pedal module are inserted into the pedal groove, when an operation signal of the pedal pad is generated, the PCB is configured to disregard the operation signal not to generate the signal related to each pedal function.

15. The foldable pedal apparatus of claim 8, wherein in the hidden state in which the accelerator pedal module and the brake pedal module are inserted into the pedal groove, the pedal casing includes a surface facing a surface of another pedal casing and the surface is formed in an inclined surface, so that in a popping-up operation of the accelerator pedal module and the brake pedal module, the pedal casings are prevented from interfering with each other.

16. The foldable pedal apparatus of claim 8, wherein in the popped-up state in which the accelerator pedal module and the brake pedal module are projected from the pedal groove, the pedal casing is in surface-contact with the foot rest panel, and when the driver manipulates the accelerator pedal module or the brake pedal module in the popped-up state, the weight of the driver is supported by the pedal casing in surface-contact with the foot rest panel.

17. The foldable pedal apparatus of claim 8,
wherein a stopper guide is integrally formed with the pedal groove, and
wherein in the hidden state in which the accelerator pedal module and the brake pedal module are inserted into the pedal groove, the pedal casing is supported while being brought into contact with the stopper guide and a gap is formed between the pedal casing and the pedal groove to prevent the pedal pad from being compressed.

18. The foldable pedal apparatus of claim 1, wherein when the accelerator pedal module and the brake pedal module are switched from the hidden state into the popped-up state, the accelerator pedal module is rotated rightward to be switched into the popped-up state and the brake pedal module is rotated leftward to be switched into the popped-up state, and the accelerator pedal module and the brake pedal module in the popped-up state are spaced from each other to prevent simultaneous manipulation of the accelerator pedal module and the brake pedal module.

19. A foldable pedal apparatus for a vehicle, the foldable pedal apparatus comprising:
an accelerator pedal module and a brake pedal module provided on a foot rest panel wherein the accelerator pedal module is rotated rightward on a first pedal hinge connected to the accelerator pedal module to be popped up and the brake pedal module is rotated leftward on a second pedal hinge connected to the brake pedal module to be popped up, and the accelerator pedal module and the brake pedal module are configured to generate signals related to pedal functions thereof in response to manipulation of a driver,
when the accelerator pedal module and the brake pedal module are switched from a hidden state into a popped-up state, the accelerator pedal module is rotated rightward to be switched into the popped-up state and the brake pedal module is rotated leftward to be switched into the popped-up state, and the accelerator pedal module and the brake pedal module in the popped-up state are spaced from each other; and
wherein the first pedal hinge and the second pedal hinge are spaced to oppositely face with each other, and the accelerator pedal module and the brake pedal module are in surface-contact with the foot rest panel when the accelerator pedal module and the brake pedal module are switched from the hidden state into the popped-up state.

20. A foldable pedal apparatus for a vehicle, the foldable pedal apparatus comprising:
an accelerator pedal module and a brake pedal module provided on a foot rest panel, wherein the accelerator pedal module is rotated rightward on a first pedal hinge connected to the accelerator pedal module to be popped up and the brake pedal module is rotated leftward on a second pedal hinge connected to the brake pedal module to be popped up, and the accelerator pedal module and the brake pedal module are configured to generate signals related to pedal functions thereof in response to manipulation of a driver,
wherein when the accelerator pedal module and the brake pedal module are rotated to be inserted into a pedal groove formed in the foot rest panel, the accelerator pedal module and the brake pedal module are in a hidden state to prevent manipulation of the accelerator pedal module and the brake pedal module by the driver, and when the accelerator pedal module and the brake pedal module are rotated to be projected from the pedal groove, the accelerator pedal module and the brake pedal module are in a popped-up state to allow manipulation of the accelerator pedal module and the brake pedal module by the driver,
wherein the first pedal hinge and the second pedal hinge are provided on first and second portions of the pedal groove to be connected to the brake pedal module and the accelerator pedal module, respectively, and
wherein the accelerator pedal module and the brake pedal module are in surface-contact with the foot rest panel when the accelerator pedal module and the brake pedal module are switched from the hidden state into the popped-up state.

\* \* \* \* \*